: US010691414B2

United States Patent
Wu et al.

(10) Patent No.: US 10,691,414 B2
(45) Date of Patent: Jun. 23, 2020

(54) RANDOM CODE GENERATOR AND ASSOCIATED RANDOM CODE GENERATING METHOD

(71) Applicant: eMemory Technology Inc., Hsin-Chu (TW)

(72) Inventors: Meng-Yi Wu, Hsinchu County (TW); Hsin-Ming Chen, Hsinchu (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 29 days.

(21) Appl. No.: 16/111,688

(22) Filed: Aug. 24, 2018

(65) Prior Publication Data
US 2019/0079732 A1   Mar. 14, 2019

Related U.S. Application Data (60) Provisional application No. 62/557,170, filed on Sep. 12, 2017.

(51) Int. Cl.
*G06F 7/58* (2006.01)
*G11C 7/06* (2006.01)
(Continued)

(52) U.S. Cl.
CPC ............. *G06F 7/588* (2013.01); *G06F 21/86* (2013.01); *G09C 1/00* (2013.01); *G11C 7/062* (2013.01);
(Continued)

(58) Field of Classification Search
CPC ... H04L 9/0866; H04L 9/0869; H04L 9/3278; G11C 17/00; G11C 17/16; G11C 17/18;
(Continued)

(56) References Cited

U.S. PATENT DOCUMENTS 9,613,714 B1   4/2017 Wong et al.
10,218,517 B2 *  2/2019 Mai .................. G06F 21/73
(Continued)

FOREIGN PATENT DOCUMENTS

EP   3026672 A1   6/2016
EP   3113409 A1   1/2017
(Continued)

OTHER PUBLICATIONS

M. Bhargava et al., An Efficient Reliable PUF-Based Cryptographic Key Generator in 65nm CMOS, EDAA 2014 (Year: 2014).*
(Continued)

*Primary Examiner* — Andrew Caldwell
*Assistant Examiner* — Emily E Larocque
(74) *Attorney, Agent, or Firm* — WPAT, PC (57) ABSTRACT

A random code generator is installed in a semiconductor chip and includes a PUF cell array, a control circuit and a verification circuit. The PUF cell array includes m×n PUF cells. The control circuit is connected with the PUF cell array. While a enroll action is performed, the control circuit enrolls the PUF cell array. The verification circuit is connected with the PUF cell array. While a verification action is performed, the verification circuit determines that p PUF cells of the PUF cell array are normal PUF cells and generates a corresponding a mapping information, wherein p is smaller than m×n. While the semiconductor chip is enabled, the control circuit reads states of the p normal PUF cells of the PUF cell array according to the mapping information and generates a random code according to the states.

13 Claims, 5 Drawing Sheets

(51) Int. Cl.
  *G09C 1/00* (2006.01)
  *H03K 3/84* (2006.01)
  *G11C 17/18* (2006.01)
  *H01L 27/112* (2006.01)
  *H04L 9/32* (2006.01)
  *G11C 17/16* (2006.01)
  *G06F 21/86* (2013.01)
  *H04L 9/08* (2006.01)
  *H03K 19/21* (2006.01)

(52) U.S. Cl.
  CPC .............. *G11C 17/16* (2013.01); *G11C 17/18* (2013.01); *H01L 27/11206* (2013.01); *H03K 3/84* (2013.01); *H04L 9/0866* (2013.01); *H04L 9/0869* (2013.01); *H04L 9/3278* (2013.01); *H03K 19/21* (2013.01); *H04L 2209/12* (2013.01)

(58) Field of Classification Search
  CPC .... G09C 1/00; G09C 1/06; G09C 1/10; G06F 7/58
  USPC .......................................................... 708/250
  See application file for complete search history.

(56) References Cited

U.S. PATENT DOCUMENTS

| | | | |
|---|---|---|---|
| 2013/0308365 A1 | 11/2013 | Smith | |
| 2015/0092939 A1* | 4/2015 | Gotze | H04L 9/34 380/2 |
| 2016/0087805 A1 | 3/2016 | Li et al. | |
| 2018/0241557 A1* | 8/2018 | Maes | G09C 1/00 |
| 2019/0182054 A1* | 6/2019 | Leobandung | G06F 7/588 |

FOREIGN PATENT DOCUMENTS

| | | |
|---|---|---|
| WO | WO2005091299 A1 | 9/2005 |
| WO | WO2013101085 A1 | 7/2013 |
| WO | WO2016102164 A1 | 6/2016 |

OTHER PUBLICATIONS

F. Tehranipoor et al., DRAM-Based Intrinsic Physically Unclonable Functions for System-Level Security and Authentication, IEEE Transactions on Very Large Scale Integration Systems, vol. 25, No. 3, Mar. 2017 (Year: 2017).*
S. Sutar, D-PUF: An Intrinsically Reconfigurable DRAM PUF for Device Authentication in Embedded Systems, CASES '16, 2016 (Year: 2016).*
M.Y. Wu et al., A PUF Scheme Using Competing Oxite Rupture with Bit Effort Rate Approaching Zero, ISSCC 2018, session 7, Neuromorphic, clocking and security circuits, 7.7 2018 (Year: 2018).*
Pandey, et al., Noise-Resilient SRAM Physically Unclonable Function Design for Security, 2016 IEEE 25th Asian Test Symposium, IEEE, 2016 (Year: 2016).*
Teng Xu, et al., "Secure remote sensing and communication using digital pufs", Oct. 20-21, 2014, pp. 173-184, ACM.
Rick Shih-Jye Shen et al., "A high-density logic CMOS process compatible non-volatile memory for sub-28nm technologies", 2014, IEEE.
Search report issued by EPO dated Feb. 11, 2019.

* cited by examiner

FIG. 1A
(PRIOR ART)

| | BL | WL | AF1 | AF2 |
|---|---|---|---|---|
| Program | 0V | Vdd | Vpp | Vpp |
| Read | 0V | Vdd | Vr | 0V |

FIG. 5B ers technology can prevent the of the semiconductor chip from being stolen. In accordance with the PUF technology, the semiconductor chip is equipped with a random code generator for providing a random code. The random code is a unique identity code (ID code) of the semiconductor chip to achieve the protecting function.

RANDOM CODE GENERATOR AND ASSOCIATED RANDOM CODE GENERATING METHOD

This application claims the benefit of U.S. provisional patent application No. 62/557,170, filed Sep. 12, 2017, the subject matter of which is incorporated herein by reference.

FIELD OF THE INVENTION

The present invention relates to a random code generator and an associated control method, and more particularly to a random code generator for a physically unclonable function (PUF) technology and an associated control method.

BACKGROUND OF THE INVENTION

A physically unclonable function (PUF) technology is a novel method for protecting the data of a semiconductor chip. That is, the use of the PUF technology can prevent the data of the semiconductor chip from being stolen. In accordance with the PUF technology, the semiconductor chip is equipped with a random code generator for providing a random code. The random code is a unique identity code (ID code) of the semiconductor chip to achieve the protecting function.

Generally, the PUF technology acquires the unique random code of the semiconductor chip according to the manufacturing variation of the semiconductor chip. This manufacturing variation includes the semiconductor process variation. That is, even if the PUF semiconductor chip is produced by a precise manufacturing process, the random code cannot be duplicated. Consequently, the PUF semiconductor chip is suitably used in the applications with high security requirements.

Moreover, U.S. Pat. No. 9,613,714 disclosed the use of a one time programming memory cell (also referred as an OTP cell) to form a random code generator so as to generate a random code.

The random code generator comprises an OTP cell. The OTP cell comprises two storing circuits. Each storing circuits comprises an antifuse transistor. The OTP cell is also referred as a physically unclonable function cell (or a PUF cell). Each PUF cell stores one bit of a random code.

Generally, if the voltage difference between the gate terminal and the source/drain terminal of the antifuse transistor is lower than a withstanding voltage, the antifuse transistor is in a high resistance state. Whereas, if the voltage difference between the gate terminal and the source/drain terminal of the antifuse transistor beyond the withstanding voltage, the gate oxide layer of the antifuse transistor is ruptured and thus the antifuse transistor is changed from the high resistance state to a low resistance state.

Figure 1A:
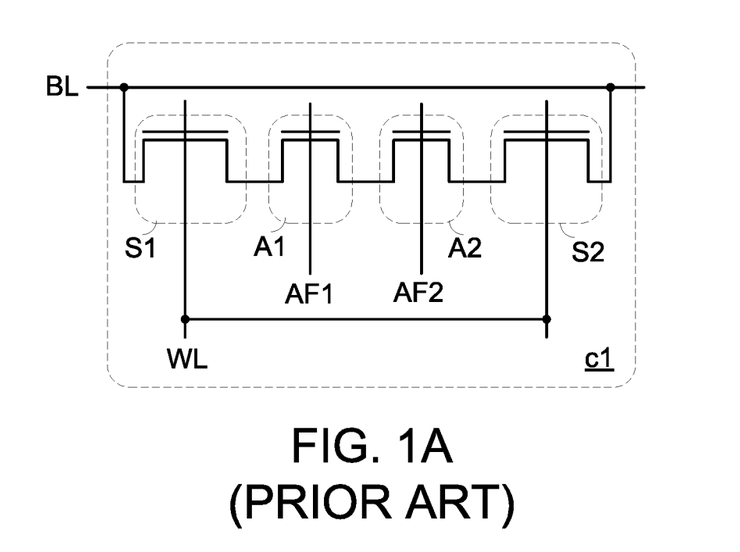
FIG. 1A (prior art) is a schematic circuit diagram illustrating a conventional PUF cell.
Figure 1B:
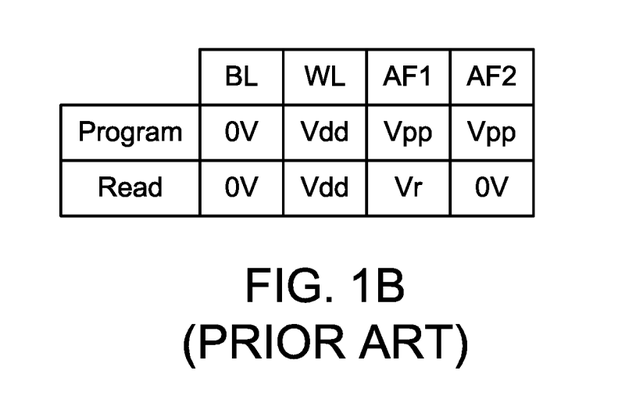
FIG. 1B (prior art) is a bias voltage table illustrating the bias voltages for enrolling and reading the conventional PUF cell of FIG. 1A.

Moreover, U.S. Pat. No. 9,613,714 disclosed various PUF cells for generating the random code. FIG. 1A is a schematic circuit diagram illustrating a conventional PUF cell. FIG. 1B is a bias voltage table illustrating the bias voltages for programming and reading the conventional PUF cell of FIG. 1A.

As shown in FIG. 1A, the PUF cell c1 comprises a first select transistor S1, a first antifuse transistor A1, a second select transistor S2 and a second antifuse transistor A2. A first source/drain terminal of the first select transistor S1 is connected with a bit line BL. A gate terminal of the first select transistor S1 is connected with a word line WL. A first source/drain terminal of the first antifuse transistor A1 is connected with a second source/drain terminal of the first select transistor S1. A gate terminal of the first antifuse transistor A1 is connected with a first antifuse control line AF1. A first source/drain terminal of the second antifuse transistor A2 is connected with a second source/drain terminal of the first antifuse transistor A1. A gate terminal of the second antifuse transistor A2 is connected with a second antifuse control line AF2. A first source/drain terminal of the second select transistor S2 is connected with a second source/drain terminal of the second antifuse transistor A2. A gate terminal of the second select transistor S2 is connected with the word line WL. A second source/drain terminal of the second select transistor S2 is connected with the bit line BL.

Please refer to FIG. 1B. During a program cycle, a ground voltage (0V) is provided to the bit line BL, a select voltage Vdd is provided to the word line WL, and a program voltage Vpp is provided to the first antifuse control line AF1 and the second antifuse control line AF2. Moreover, during the program cycle, the bias voltage provided to the word line WL may be in the range between the select voltage Vdd and a voltage Vdd2. The voltage Vdd2 is higher than the select voltage Vdd, and the voltage Vdd2 is lower than the program voltage Vpp. Furthermore, the program cycle and the enroll cycle are the same in PUF technology. That is to say, the PUF cell can be enrolled during the enroll action.

During the program cycle, both of the first select transistor S1 and the second select transistor S2 are turned on and both of the first antifuse transistor A1 and the second antifuse transistor A2 receive the program voltage Vpp. Consequently, the state of one of the first antifuse transistor A1 and the second antifuse transistor A2 is changed. For example, the first antifuse transistor A1 is changed to the low resistance state, but the second antifuse transistor A2 is maintained in the high resistance state. Alternatively, the second antifuse transistor A2 is changed to the low resistance state, but the first antifuse transistor A1 is maintained in the high resistance state. Due to the process variations of the antifuse transistors A1 and A2, it is unable to predict which of the antifuse transistors A1 and A2 has the changed state during the program cycle.

During a read cycle, the ground voltage (0V) is provided to the bit line BL, the select voltage Vdd is provided to the word line WL, and a read voltage Vr is provided to the first antifuse control line AF1. Moreover, during the read cycle, the bias voltages provided to the word line WL and the read voltage Vr may be in the range between the select voltage Vdd and the voltage Vdd2. The voltage Vdd2 is higher than the select voltage Vdd, and the voltage Vdd2 is lower than the program voltage Vpp.

During the read cycle, the first select transistor S1 and the second select transistor S2 are turned on and the first antifuse transistor A1 generates a read current to the bit line BL. Generally, the read current generated by the first antifuse transistor A1 in the low resistance state is higher, and the read current generated by the first antifuse transistor A1 in the high resistance state is lower. For example, the read current generated by the first antifuse transistor A1 in the low resistance state is 10 pA, and the read current generated by the first antifuse transistor A1 in the high resistance state is 0.1 pA.

Moreover, during the read cycle, a sensing circuit (not shown) determines the storage state of the PUF cell c1 according to the magnitude of the read current from first antifuse transistor A1. In case that the read current generated by the first antifuse transistor A1 is higher, the PUF cell c1 is judged to be in a first storage state. Whereas, in case that the read current generated by the first antifuse transistor A1 is lower, the PUF cell c1 is judged to be in a second storage state.

Due to the process variations of the antifuse transistors A1 and A2, it is unable to predict which of the antifuse transistors A1 and A2 has the changed state during the program cycle. After the PUF cell c1 is programmed, the storage state of the PUF cell c1 is used as a bit of a random code.

Moreover, the random code generator comprises plural PUF cells. After the plural PUF cells are programmed, the random code generator generates a random code according to the storage sates of the plural PUF cells. For example, the random code generator comprises eight PUF cells. After the eight PUF cells are programmed, the random code generator generates a one-byte random code according to the storage sates of the eight PUF cells.

Since the random code is a unique ID code of the semiconductor chip, it is necessary to maintain the accuracy of the random code. If the random code generated by the random code generator is erroneous, the semiconductor chip cannot acquire the protected internal data according to the erroneous random code. In other words, the semiconductor chip cannot be normally operated.

SUMMARY OF THE INVENTION

An embodiment of the present invention provides a random code generator. The random code generator is installed in a semiconductor chip. The random code generator includes a PUF cell array, a control circuit and a verification circuit. The PUF cell array includes m×n PUF cells. The control circuit is connected with the PUF cell array. While a enroll action is performed, the control circuit enrolls the PUF cell array. The verification circuit is connected with the PUF cell array. While a verification action is performed, the verification circuit determines that p PUF cells of the PUF cell array are normal PUF cells and generates a corresponding a mapping information, wherein p is smaller than m×n. While the semiconductor chip is enabled, the control circuit reads states of the p normal PUF cells of the PUF cell array according to the mapping information and generates a random code according to the states.

Another embodiment of the present invention provides a control method for a random code generator. The random code generator includes a PUF cell array with m×n PUF cells. Firstly, the PUF cell array is enrolled. Then, p PUF cells of the PUF cell array are determined as normal PUF cells and a mapping information is generated, wherein p is smaller than m×n. While the semiconductor chip is enabled, the states of the p normal PUF cells of the PUF cell array are read according to the mapping information and a random code is generated according to the states.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Ideally, after the PUF cell is enrolled, the gate oxide layer of only one antifuse transistor is ruptured and the state is changed. Whereas, the gate oxide layer of the other antifuse transistor is not ruptured, and the state is not changed. This PUF cell is a normal PUF cell.

In few situations, some problems occur after the PUF cell is enrolled. For example, both of the gate oxide layers of the two antifuse transistors are ruptured, or both of the gate oxide layers of the two antifuse transistors are not ruptured, or the gate oxide layer of the antifuse transistor is not completely ruptured. In case that the above problems occur, the PUF cell is referred as a low reliability PUF cell. The low reliability PUF cell may result in a bit flipping problem. Consequently, it is difficult to accurately judge the state of the low reliability PUF cell. That is, the PUF cell is in the first state in some situations, and the PUF cell is in the second state in other situations.

If the random code generator contains the low reliability PUF cell, the random code generator possibly generates the erroneous random code. Under this circumstance, the semiconductor chip cannot be normally operated.

Figure 2:
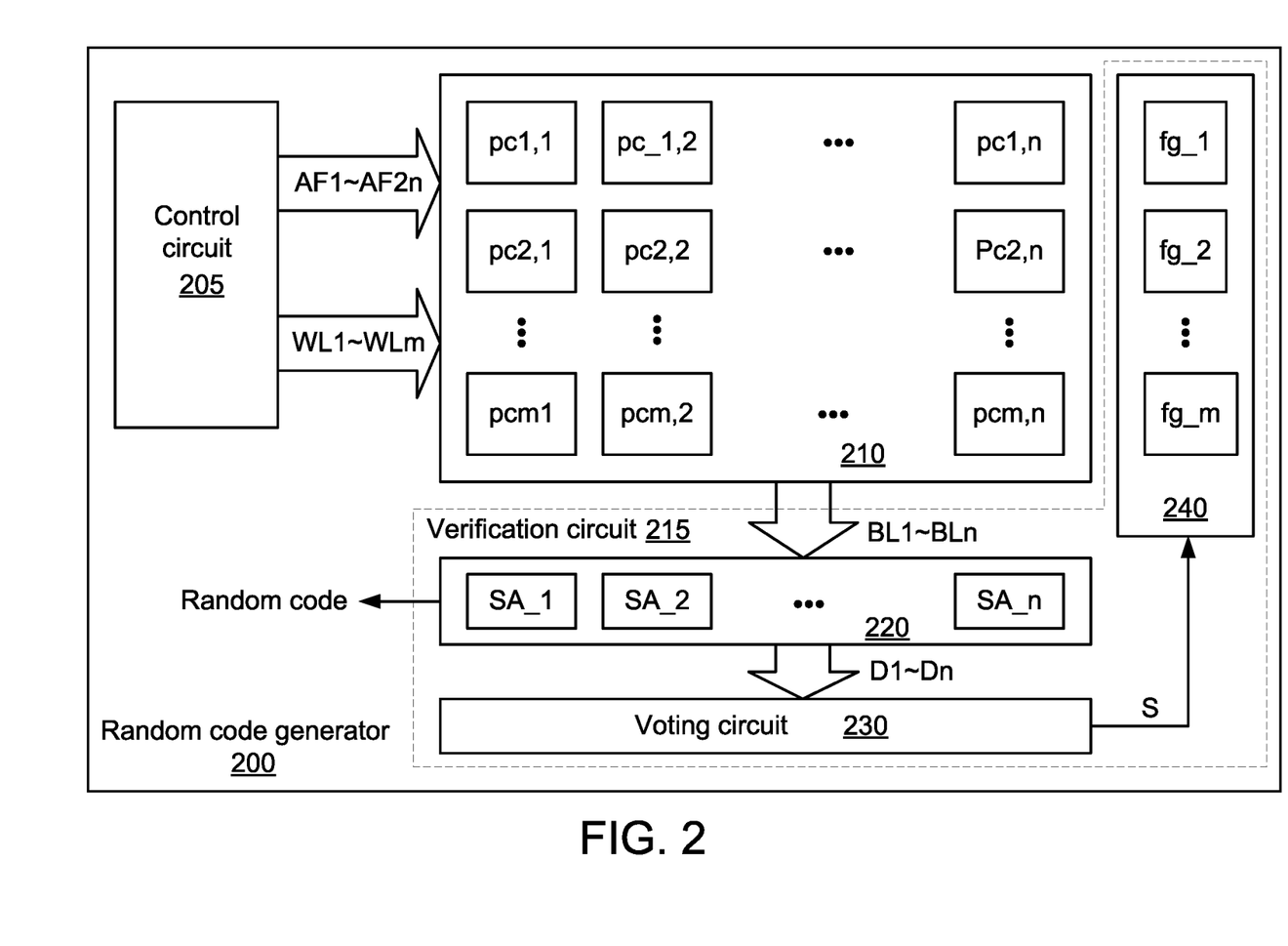
FIG. 2 schematically illustrates the architecture of a random code generator according to an embodiment of the present invention.

FIG. 2 schematically illustrates the architecture of a random code generator according to an embodiment of the present invention. The random code generator is constructed in a semiconductor chip. As shown in FIG. 2, the random code generator 200 comprises a control circuit 205, a PUF cell array 210 and a verification circuit 215. The PUF cell array 210 comprises m×n PUF cells pc1,1~pcm,n.

The control circuit 205 is connected with the PUF cell array 210 in order to control a enroll action, a read action or a verification action of the PUF cell array 210.

In the PUF cell array 210 of FIG. 2, the structure of each of the PUF cells pc1,1~pcm,n is similar to the structure of the PUF cell of FIG. 1A. That is, each of the PUF cells pc1,1~pcm,n is connected with a word line, a bit line and two antifuse control lines. That is, the PUF cell array 210 is connected with m word lines WL1~WLm, n bit lines BL1~BLn and 2n antifuse control lines AF1~AF2n.

In an embodiment, the PUF cells of the PUF cell array 210 are differential PUF cells. Each differential PUF cell generates one bit of a random code. Under this circumstance, each differential PUF cell is connected with a word line, a bit line pair and two antifuse control lines.

The verification circuit 215 comprises a sensing circuit 220, a voting circuit 230 and an information block 240.

The sensing circuit 220 comprises n sense amplifier SA_1~SA_n, which are connected with the corresponding bit lines BL1~BLn. During a enroll cycle, the sensing circuit 220 provides a proper voltage (e.g., 0V) to the bit lines BL1~BLn. During a read cycle, the sense amplifier SA_1~SA_n of the sensing circuit 220 judges the states of the corresponding PUF cells according to the magnitudes of the read currents from the bit lines BL1~BLn and generate data signals D1~Dn.

The voting circuit 230 is connected with the sensing circuit 220 to receive the data signals D1~Dn. While the verification action is performed (i.e., during a verification cycle), the voting circuit 230 judges whether the PUF cells are low reliability PUF cells according to the data signals D1~Dn and generates a result signal S.

The information block 240 generates a mapping information according to the result signal S. In this embodiment, the information block 240 comprises plural flags fg_1~fg_m. Each of the flags fg_1~fg_m is a non-volatile memory. Moreover, according to the result signal S, the voting circuit 230 selectively sets the flags fg_1~fg_m to determine the mapping information. That is, the mapping information acquired by the information block 240 records the positions of the normal PUF cells of the PUF cell array 210. According to the mapping information of the information block 240, the control circuit 205 selects the normal PUF cells of the PUF cell array 210 to determine a random code.

Figure 3:
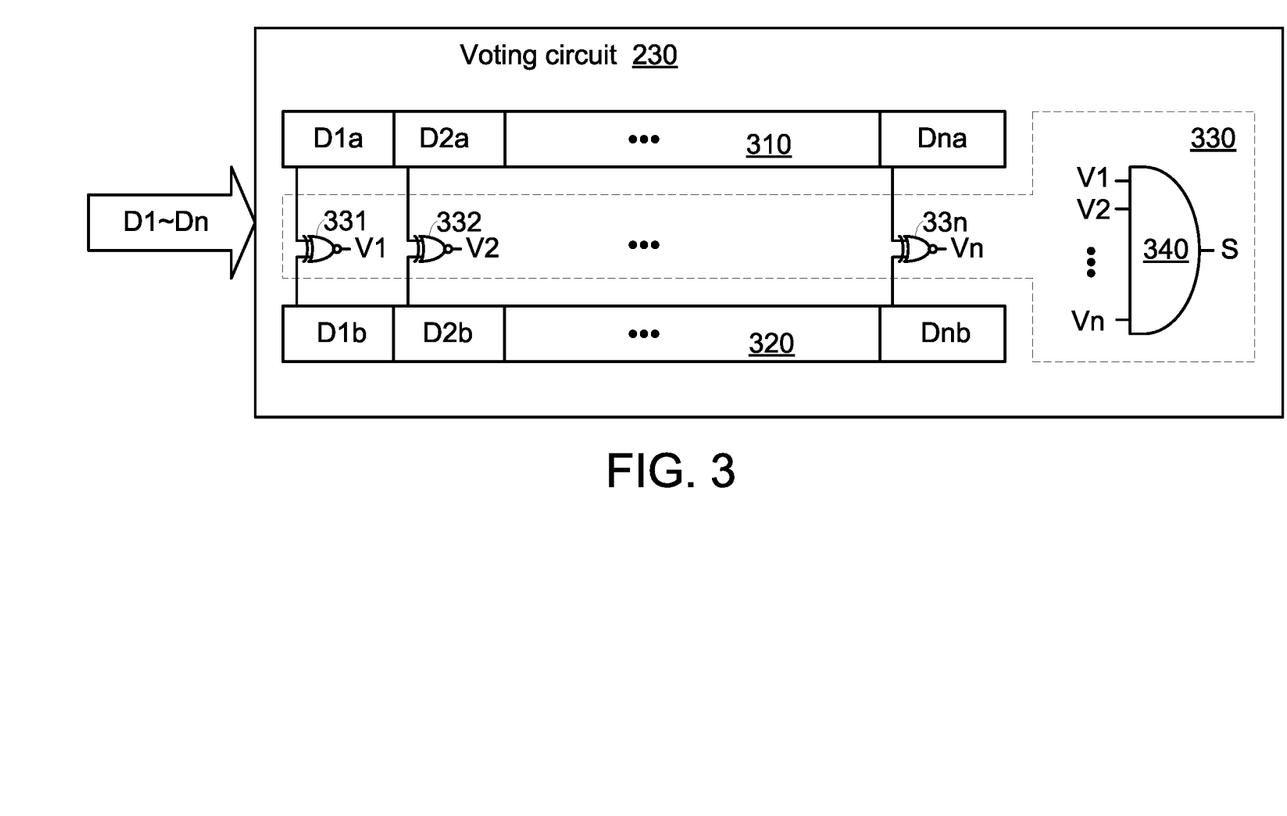
FIG. 3 schematically illustrates the architecture of the voting circuit of the random code generator according to the embodiment of the present invention.

FIG. 3 schematically illustrates the architecture of the voting circuit of the random code generator according to the embodiment of the present invention. As shown in FIG. 3, the voting circuit 230 comprises a first buffer 310, a second buffer 320 and a judging circuit 330. In a first verification environment of the verification action, the first buffer 310 receives the data signals D1~Dn from the sensing circuit 220. The data signals D1~Dn are stored in the first buffer 310 as a first read data D1a~Dna. In a second verification environment of the verification action, the second buffer 320 receives the data signals D1~Dn from the sensing circuit 220. The data signals D1~Dn are stored in the second buffer 320 as a second read data D1b~Dnb.

According to the result of judging whether the first read data are identical to the second read data, the judging circuit 330 generates the result signal S. The judging circuit 330 comprises n XNOR gates 331~33n and an AND gate 340. The first XNOR gate 331 receives the first bit D1a of the first buffer 310 and the first data D1b of the second buffer 320 and outputs a first voting signal V1. The second XNOR gate 332 receives the second bit D2a of the first buffer 310 and the second data D2b of the second buffer 320 and outputs a second voting signal V2. The rest may be deduced by analogy. The AND gate 340 receives the n voting signals V1~Vn and generates the result signal S.

If the first read data is identical to the second read data, all of the n voting signals V1~Vn are in a high logic level state, and thus the result signal S is in the high logic level state. Whereas, if the first read data is not identical to the second read data, at least one of the n voting signals V1~Vn is in a low logic level state, and thus the result signal S is in the low logic level state. That is, the result signal S in the high logic level state indicates that the first read data is identical to the second read data, and the result signal S in the low logic level state indicates that the first read data is not identical to the second read data.

The structure of the judging circuit 330 is not restricted. For example, in another embodiment, the judging circuit 330 comprises n XOR gates and an OR gate. The first XOR gate receives the first bit D1a of the first buffer 310 and the first data D1b of the second buffer 320 and outputs a first voting signal V1. The second XOR gate receives the second bit D2a of the first buffer 310 and the second data D2b of the second buffer 320 and outputs a second voting signal V2. The rest may be deduced by analogy. The OR gate receives the n voting signals V1~Vn and generates the result signal S. The result signal S in the low logic level state indicates that the first read data is identical to the second read data. The result signal S in the high logic level state indicates that the first read data is not identical to the second read data.

Figure 4A:
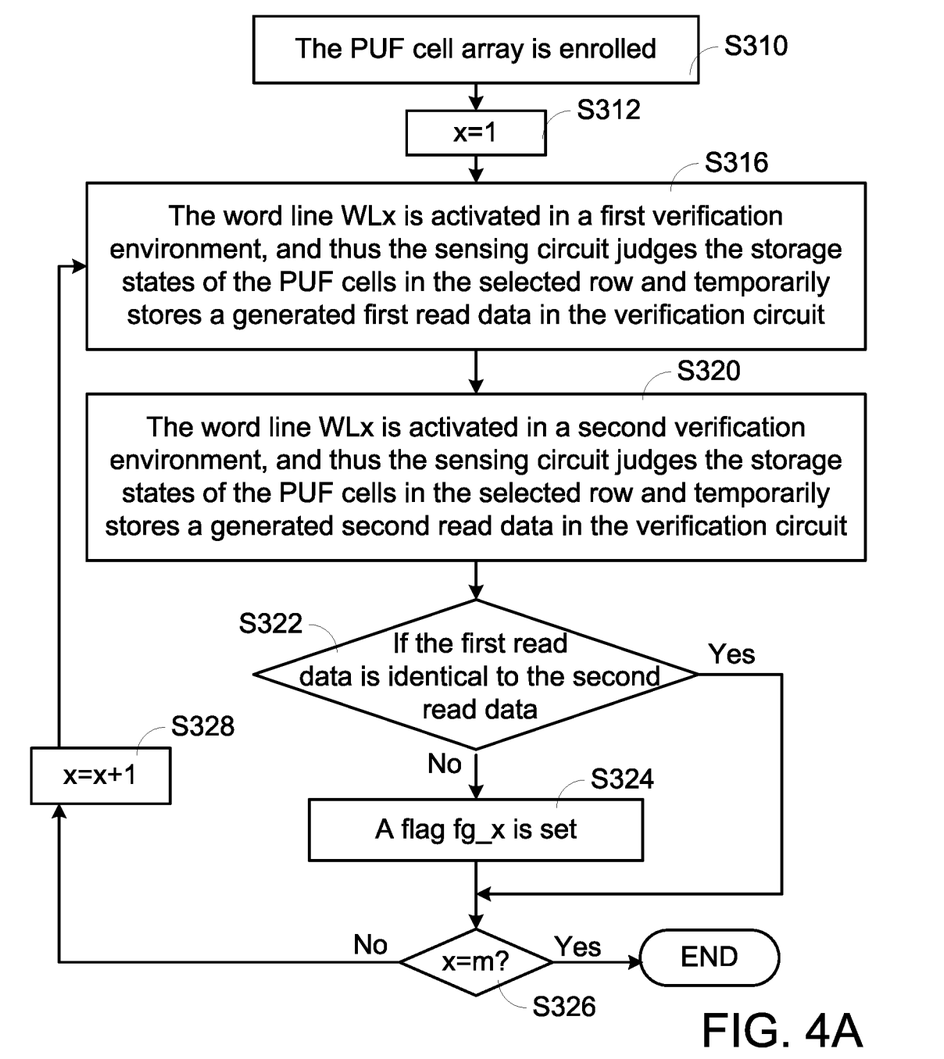
FIG. 4A is a flowchart illustrating a method of controlling the enroll action and the verification action of the random code generator according to the embodiment of the present invention.

FIG. 4A is a flowchart illustrating a method of controlling the enroll action and the verification action of the random code generator according to the embodiment of the present invention.

Firstly, the PUF cell array 210 is enrolled (Step S310). While the enroll action is performed to enroll the PUF cell array 210, a enroll voltage Vpp is provided to the antifuse control lines AF1~AF2n, and a ground voltage (0V) is provided to the bit lines BL1~BLn. Moreover, a select voltage Vdd is provided to the word lines WL1~WLm sequentially. Consequently, the word lines WL1~WLm are activated sequentially. In such way, all PUF cells pc1, 1~pcm,n of the PUF cell array 210 are enrolled.

For example, when the select voltage Vdd is provided to the word line WL1, the word line WL1 is activated and the first row is a selected row. Consequently, the n PUF cells pc1,1~pc1,n in the selected row are enrolled. Similarly, when the select voltage Vdd is provided to the word line WL2, the word line WL2 is activated and the second row is a selected row. Consequently, the n PUF cells pc2, 1~pc2, n in the selected row are enrolled. The rest may be deduced by analogy. After all of the word lines WL1~WLm are activated, all PUF cells pc1, 1~pcm, n of the PUF cell array 210 are enrolled.

After the step S310, the verification action is performed. While the verification action is performed, different verification environments are provided. Moreover, the control circuit judges whether the same PUF cell in different verification environments is in the same state. For example, in different verification environments, different read voltages Vr are provided to perform the read action, or the read action is performed at different operating temperatures or with different sensing speed.

Please refer to FIG. 4A again. Then, set x=1 (Step S312).

Then, the word line WLx is activated in a first verification environment, and thus the sensing circuit 220 judges the states of the PUF cells in the selected row and temporarily stores a generated first read data in the voting circuit 230 (Step S316). For example, the control circuit 205 provides a first read voltage Vr1 to the odd-numbered antifuse control lines and provides the ground voltage (0V) to the even-numbered antifuse control lines. Consequently, the sensing circuit 220 generates the first read data.

Then, the word line WLx is activated in a second verification environment, and thus the sensing circuit 220 judges the states of the PUF cells in the selected row and temporarily stores a generated second read data in the voting circuit 230 (Step S320). For example, the control circuit 205 provides a second read voltage Vr1 to the even-numbered antifuse control lines and provides the ground voltage (0V) to the odd-numbered antifuse control lines. Consequently, the sensing circuit 220 generates the second read data.

Then, a step S322 is performed to judge whether the first read data is identical to the second read data. If the judging result of the step S322 indicates that the first read data is not identical to the second read data, at least one of the PUF cells in the selected row is a low reliability PUF cell. Then, the voting circuit 230 sets a flag fg_x in the information block 240 (Step S324). Then, a step S326 is performed to judge whether x is equal to m. If the judging result of the step S326 indicates that x is equal to m, the verification action is ended. If the judging result of the step S326 indicates that x is not equal to m, a step S326 of setting x=x+1 (Step S326) is performed and the step S316 is repeatedly done.

Whereas, if the judging result of the step S322 indicates that the first read data is identical to the second read data, all PUF cells in the selected row are normal PUF cells. Then, a step S326 is performed to judge whether x is equal to m. If the judging result of the step S326 indicates that x is equal to m, the verification action is ended. If the judging result of the step S326 indicates that x is not equal to m, a step S326 of setting x=x+1 (Step S326) is performed and the step S316 is repeatedly done.

Figure 4B:
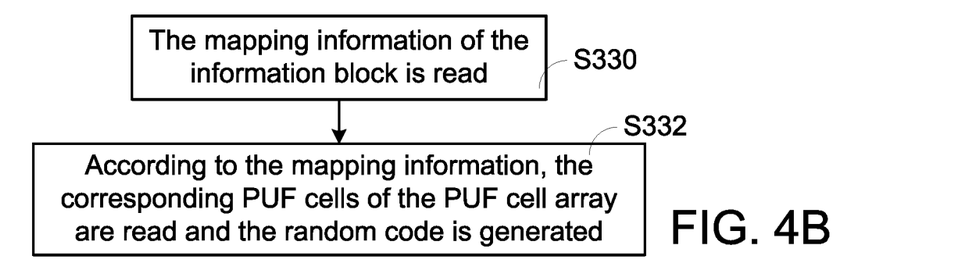
FIG. 4B is a flowchart illustrating a process of generating the random code by the random code generator according to the embodiment of the present invention.

FIG. 4B is a flowchart illustrating a process of generating the random code by the random code generator according to the embodiment of the present invention. After the verification action is completed, the random code generator can generate the random code. Firstly, the control circuit 205 reads the mapping information of the information block 240 (Step S330). Then, according to the mapping information, the control circuit 205 reads the corresponding PUF cells of the PUF cell array 210 and generates the random code (Step S332). That is, after the control circuit 205 reads the states of the normal PUF cells of the PUF cell array 210 according to the mapping information, the states of the normal PUF cells of the PUF cell array 210 are constituted as the random code. Consequently, when the semiconductor chip is enabled, the random code generator 200 generates the random code.

For well understanding the random code generator 200, the PUF cell array 210 with 16×128 PUF cells (i.e., m=16 and n=128) will be described as follows. In addition, the random code generator 200 generates a 128-bit random code.

Figure 5A:
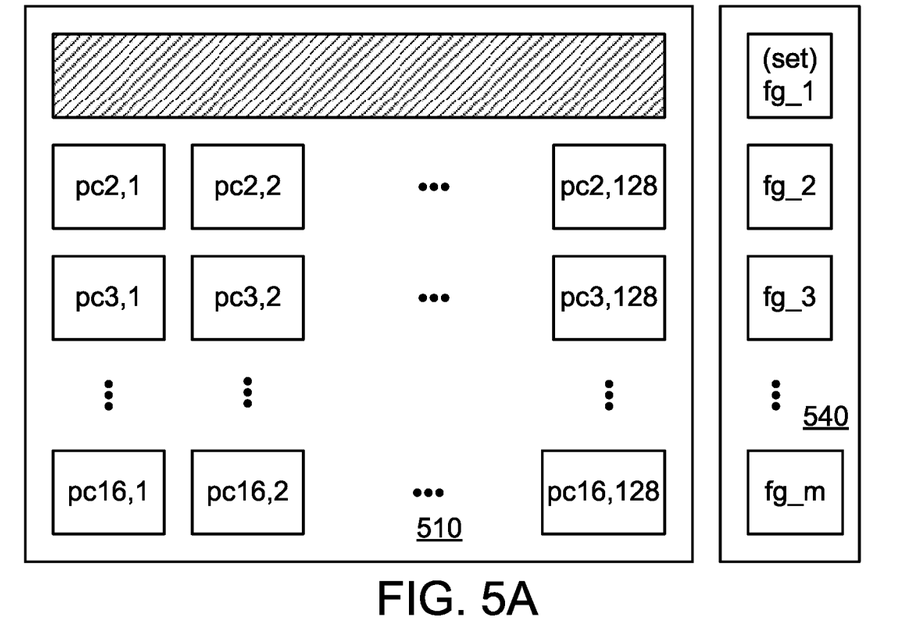
FIGS. 5A and 5B schematically illustrate a process of controlling the verification action of the random code generator according to the embodiment of the present invention.
Figure 5B:
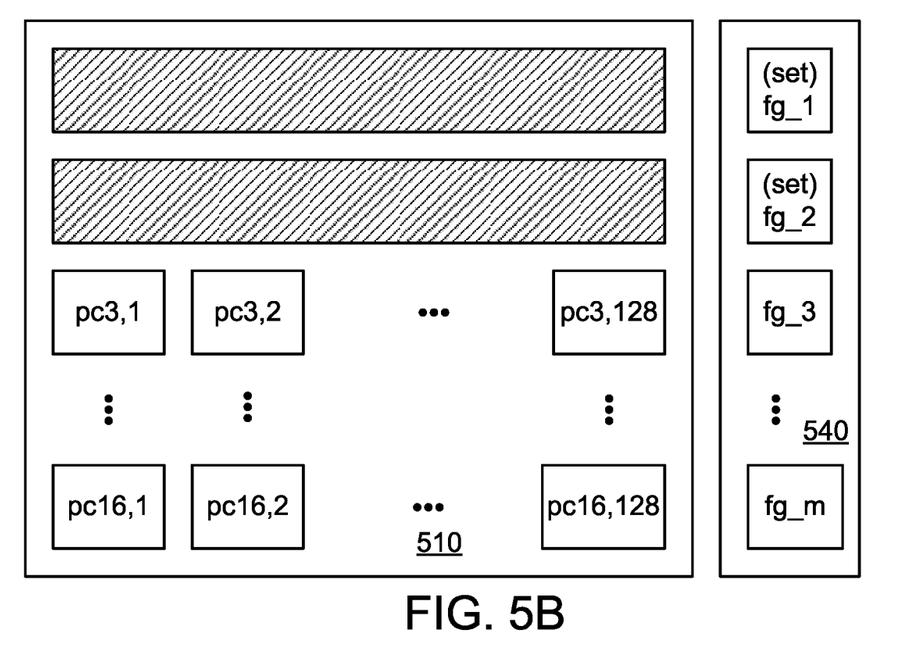

FIGS. 5A and 5B schematically illustrate a process of controlling the verification action of the random code generator according to the embodiment of the present invention.

As shown in FIG. 5A, the first row of the PUF cell array 510 is the selected row. If the first read data and the second read data generated by the selected row in different verification environments are not identical, the flag fg_1 in the information block 540 is set. For example, the flag fg_1 is set as a first state. In other words, at least one of the 128 PUF cells pc1,1~pc1,128 in the first row is the low reliability PUF cell. Since the data signal generated by the sensing circuit possibly contains the error bit, the first row is not employed to generate the random code by the control circuit.

As shown in FIG. 5B, the second row of the PUF cell array 510 is the selected row. If the first read data and the second read data generated by the selected row in different verification environments are not identical, the flag fg_2 in the information block 540 is set. For example, the flag fg_2 is set as the first state. In other words, at least one of the 128 PUF cells pc2,1~pc2,12 in the second row is the low reliability PUF cell. Since the data signal generated by the sensing circuit possibly contains the error bit, the first row is not employed to generate the random code by the control circuit.

If the third row of the PUF cell array 510 is the selected row and the first read data and the second read data generated by the selected row in different verification environments are identical, the flag fg_3 in the information block 540 is unset. For example, the flag fg_3 is maintained in a second state. In other words, the 128 PUF cells pc3, 1~pc3, 128 in the third row are the normal PUF cells.

Furthermore, the same verification process can apply to other rows of the cell array 510 and is not redundantly described herein When the semiconductor chip is enabled, the control circuit starts to read the mapping information of the information block 540. In an embodiment, the control circuit searches the first unset flag from the information block 540 according to the sequence from the flag fg_1 to the flag fg_m. As shown in FIG. 5B, the first unset flag searched by the control circuit is the flag fg_3. Consequently, the third word line WL3 corresponding to the flag fg_3 is activated. According to the magnitudes of the currents on the bit lines, the sensing circuit judges the states of the 128 PUF cells pc3,1~pc3,128 in the third row of the PUF cell array 510. Consequently, a 128-bit random code is generated.

In the flowchart of FIG. 4A, the control circuit performs the verification action after all PUF cells of the PUF cell array are enrolled. It is noted that the enroll action and the verification action are not restricted. For example, in another embodiment, the control circuit performs the verification action after one row of PUF cells in the PUF cell array are enrolled.

In the flowchart of FIG. 4A, the verification action is ended when all rows of PUF cells are verified and the positions of the normal PUF cells are recorded in the information block. It is noted that numerous modifications and alterations may be made while retaining the teachings of the invention.

For example, the random code generator comprises a PUF cell array with 16×128 PUF cells, and the random code generator is used for generating a 256-bit random code. Under this circumstance, the verification action is ended when two rows of PUF cells are verified as the normal PUF cells and the positions of the normal PUF cells are recorded in the information block. When the semiconductor chip is enabled, the control circuit sequentially activates two corresponding word lines according to the mapping information and generates the 256-bit random code. That is, after the verification action is completed, some PUF cells in the PUF cell array have not been enrolled.

Moreover, the judging circuit 330 of voting circuit 230 can judge the positions of the low reliability PUF cells and the normal PUF cells. In some embodiments, the low reliability PUF cells in the selected row are substituted by the normal PUF cells in other rows of the PUF cell array 510. For example, after the verification action is completed, the PUF cells in the first row of the PUF cell array 510 contain 12 low reliability PUF cells and 116 normal PUF cells, whose positions are recorded in the information block 540. Moreover, after the verification action is completed, the PUF cells in the second row of the PUF cell array 510 contain 12 normal PUF cells, whose positions are recorded in the information block 540. When the semiconductor chip is enabled, the control circuit generates a 128-bit random code according to the 116 normal PUF cells in the first row of the PUF cell array 510 and the 12 normal PUF cells in the second row of the PUF cell array 510.

From the above descriptions, the present invention provides a random code generator and an associated control method. The PUF cell array of the random code generator comprises m×n PUF cells. After the enroll action is performed on the PUF cell array, the verification action is performed. After the verification action is performed in different verification environments, p PUF cells of the PUF cell array are determined as the normal PUF cells, wherein p is smaller than m×n. The positions of the normal PUF cells are recorded in the mapping information. When the semiconductor chip is enabled, the control circuit of the random code generator reads the states of the p normal PUF cells of the PUF cell array and generates the random code.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A random code generator installed in a semiconductor chip, the random code generator comprising:
    a PUF cell array comprising m×n PUF cells;
    a control circuit connected with the PUF cell array, wherein while an enroll action is performed, the control circuit enrolls the PUF cell array; and
    a verification circuit connected with the PUF cell array,
    wherein while a verification action is performed, the verification circuit sets a first flag corresponding to a first row of the PUF cell array to a first state if at least one of n PUF cells in the first row of the PUF cell array is a low reliability PUF,
    wherein while the verification action is performed, the verification circuit maintains a second flag corresponding to a second row of the PUF cell array in a second state if n PUF cells in the second row of the PUF cell array are normal PUF cells,
    wherein while the semiconductor chip is enabled, the control circuit reads states of the n normal PUF cells in the second row of the PUF cell array according to the second state stored in the second flag and generates a random code according to the states of the n normal PUF cells in the second row of the PUF cell array.

2. The random code generator as claimed in claim 1, wherein the verification circuit comprises:
    a sensing circuit connected with the PUF cell array, wherein the sensing circuit generates a data signal according to a result of sensing the states of n PUF cells in a selected row of the PUF cell array;
    a voting circuit generating a result signal according to the data signal; and
    an information block comprising plural flags, wherein the plural flags are selectively set by the voting circuit according to the result signal.

3. The random code generator as claimed in claim 2, wherein the voting circuit receives the data signal as a first read data in a first verification environment, and the voting circuit receives the data signal as a second read data in a second verification environment, wherein if the first read data and the second read data are not identical, at least one of the n PUF cells in the selected row is the low reliability PUF cell and a selected flag of the information block corresponding to the selected row is set to the first state.

4. The random code generator as claimed in claim 3, wherein if the first read data and the second read data are identical, all of the n PUF cells in the selected row are normal PUF cells and the selected flag corresponding to the selected row is maintained in the second state.

5. The random code generator as claimed in claim 3, wherein the control circuit provides a first read voltage to the selected row in the first verification environment, so that the sensing circuit generates the data signal, wherein the control circuit provides a second read voltage to the selected row in the second verification environment, so that the sensing circuit generates the data signal.

6. The random code generator as claimed in claim 3, wherein the sensing circuit generates the data signal at a first temperature in the first verification environment, and the sensing circuit generates the data signal at a second temperature in the second verification environment.

7. The random code generator as claimed in claim 3, wherein the sensing circuit generates the data signal with a first sensing speed in the first verification environment, and the sensing circuit generates the data signal with a second sensing speed in the second verification environment.

8. A control method for a random code generator, the control method comprising steps of:
    enrolling m×n PUF cells of a the PUF cell array;
    setting a first flag corresponding to a first row to a first state if at least one of n PUF cells in the first row of the PUF cell array is a low reliability PUF;
    maintaining a second flag corresponding to a second row in a second state if n PUF cells in the second row of the PUF cell array are normal PUF cells; and
    reading states of the n normal PUF cells in the second row of the PUF cell array according to the second state stored in the second flag and generating a random code according to the states of the n normal PUF cells in the second row of the PUF cell array while a semiconductor chip is enabled.

9. The control method as claimed in claim 8, wherein the control method further comprises steps of:
    reading n PUF cells in a selected row of the PUF cell array in a first verification environment, so that a first read data is generated; and
    reading the n PUF cells in the selected row of the PUF cell array in a second verification environment, so that a second read data is generated,
    wherein if the first read data and the second read data are not identical, at least one of then PUF cells in the selected row is the low reliability PUF cell and a selected the flag of the information block corresponding to the selected row is set to the first state.

10. The control method as claimed in claim 9, wherein if the first read data and the second read data are identical, all of the n PUF cells in the selected row are normal PUF cells and the selected flag corresponding to the selected row is maintained in the second state.

11. The control method as claimed in claim 9, wherein a first read voltage is provided to the selected row in the first verification environment, so that the first read data is generated, wherein a second read voltage is provided to the selected row in the second verification environment, so that the second read data is generated.

12. The control method as claimed in claim 9, wherein the first read data is generated at a first temperature in the first verification environment, and the second read data is generated at a second temperature in the second verification environment.

13. The control method as claimed in claim 9, wherein the first read data is generated with a first sensing speed in the first verification environment, and the second read data is generated with a second sensing speed in the second verification environment.

\* \* \* \* \*